United States Patent
Brenner et al.

(10) Patent No.: US 6,365,866 B1
(45) Date of Patent: Apr. 2, 2002

(54) METHOD FOR BEAM WELDING OF HARDENABLE STEELS BY MEANS OF SHORT-TIME HEAT TREATMENT

(75) Inventors: Berndt Brenner, Pappritz; Rüdiger Arnold Gnann, Ravensburg; Dietmar Naunapper, Oberrimsingen; Carsten Duschek, Dresden, all of (DE)

(73) Assignees: Fraunhofer-Gesellschaft zur Föderung der angewandten Forschung e.V., München; Arnold Maschinenfabrik GmbH & Co., Ravensburg, both of (DE)

(*) Notice: Subject to any disclaimer, the term of this patent is extended or adjusted under 35 U.S.C. 154(b) by 0 days.

(21) Appl. No.: 09/147,809
(22) PCT Filed: May 14, 1997
(86) PCT No.: PCT/DE97/00994
  § 371 Date: May 3, 1999
  § 102(e) Date: May 3, 1999
(87) PCT Pub. No.: WO98/10884
  PCT Pub. Date: Mar. 19, 1998

(30) Foreign Application Priority Data
Sep. 13, 1996 (DE) .......................... 196 37 465

(51) Int. Cl.[7] .............................................. B23K 15/00
(52) U.S. Cl. .......................... 219/121.14; 219/121.13; 219/121.12; 219/121.11; 219/121.16; 148/508; 148/516; 148/525
(58) Field of Search ...................... 219/121.14, 121.13, 219/121.12, 121.11, 121.16; 148/508, 516, 525

(56) References Cited

U.S. PATENT DOCUMENTS

| | | | | |
|---|---|---|---|---|
| 3,933,534 A | * | 1/1976 | Ettenreich et al. | 148/12 B |
| 4,020,312 A | * | 4/1977 | Araki et al. | 219/61 |
| 4,090,813 A | * | 5/1978 | Minato et al. | 416/184 |
| 5,855,846 A | * | 1/1999 | Beguinot et al. | 420/121 |
| 5,900,075 A | * | 5/1999 | Koo et al. | 148/328 |

FOREIGN PATENT DOCUMENTS

| | | |
|---|---|---|
| DE | 2135667 | 1/1973 |
| EP | 721818 | 7/1996 |
| JP | 64-40194 | 2/1989 |

OTHER PUBLICATIONS

English translation of Abstract of JP 64–40194 (see above).

"Qualitäts–und Edelstähle", (Quality and Stainless–Steels of GDR, Leipzig, 1971, vol. 1) published 1971 (no translation).

J. Ruge, "Handbuch der Schweisstechnik", (Manual of Welding Technology) published 1991 (no translation).

\* cited by examiner

*Primary Examiner*—M. Alexandra Elve
(74) *Attorney, Agent, or Firm*—Greenblum & Bernstein, P.L.C.

(57) ABSTRACT

The invention concerns a method for beam welding of hardenable steels using a short-time heat treatment. A preferred area of application of the invention is motor vehicle and mechanical engineering. In the method according to the invention, the short-time heat treatment occurs first as the sole preheating in a defined manner, and then the beam welding begins after a defined cooling time, at the latest.

14 Claims, 1 Drawing Sheet

METHOD FOR BEAM WELDING OF HARDENABLE STEELS BY MEANS OF SHORT-TIME HEAT TREATMENT

BACKGROUND OF THE INVENTION

1. Field of the Invention

The invention concerns the beam welding of engineering components made of hardenable steel. The invention is useful for all components joinable by beam welding methods, which components are subjected to mechanically, cyclically, or dynamically high loads. Because of a local wear load, these components consist at least partially of hardenable steels or which are hardened and annealed because of their high mechanical load. The invention can be used particularly advantageously for the production of extremely varied, in particular rotationally symmetric power transmission elements, pressure-exposed hollow parts, hydraulic rams, valves, etc. A preferred area of application of the invention is motor vehicle and mechanical engineering, primarily automotive engineering.

2. Description of Background Information

Carbon steels with a carbon content of $C \geq 0.25\%$ and low-alloy steels with carbon contents of $C \geq 0.20\%$ are only weldable to a limited extent by commercial means, as the increased hardening in the welding and heat affected zone caused by the carbon and by various alloy elements results in cracks. The hardening and subsequent crack formation occurs through the formation of martensite or lower bainite, which are only slightly deformable, and slightly (or not at all) self-annealed, which are incapable of plastically mitigating the high transient stresses occurring during cooling.

A method to prevent inadmissible hardening, and thus also crack formation with conventional welding methods requires the bulk preheating of the components. For carbon steels with carbon contents C of $0.3\% \leq C \leq 0.45\%$, preheating temperatures of 150 to 275° C. are recommended (see, e.g., J. Ruge "Manual of Welding Technology", Vol. 1, "Materials", 3rd ed., Springer-Verlag, Heidelberg 1991, ISBN-3-540-52697-8, p. 126, p. 144]. For low-alloy steels, the necessary preheating temperature may rise to temperatures as high as 400° C. (see, e.g., Quality and Stainless-Steels of the GDR, Leipzig, 1972, Vol. 1).

However, for many components, in particular mass-produced components, conventional welding methods have disadvantages with regard to welding speed, component distortion, unit costs, and after-treatment expense. These shortcomings are from relatively low power densities, which result in relatively low heating speeds, relatively high introduction of heat, and large welding seam volumes.

Beam welding methods such as laser or electron beam welding avoid these disadvantages by using power densities which are as many as a few orders of magnitude higher. However, such methods result in a higher hardening of the fusion heat affected zone, with a corresponding higher susceptibility to cracking of the welding seams. This shortcoming severely restricts the palette of beam weldable steels, since the limit of carbon and alloy element content which can be managed without cracking drops.

The effects of these drawbacks are increased, in that conventional methods of bulk preheating can be integrated into automated beam welding systems only with difficulty. Short cycle times are too expensive, and result in a deterioration of welding seam quality from oxidation of the joint.

This drawback is caused by extremely high quenching speed, which is clearly less than the $t_{8/5}$-times.

According to the patent J-1-40194 entitled "Laser Beam Welding method for joining material", a method is known for laser welding non-hardenable metal sheets to reduce the quenching speed with laser welding by process-integrated post-heating. For this, a high frequency inductor—located behind the laser welding head in terms of the feed rate and fixedly connected thereto—is guided at the laser welding rate at a distance from the surface determined by the focus distance of the laser beam and the geometric layout. Because of the use of the high frequency, a narrow strip is heated on both sides of the I-welding seam of the welded sheet, and thus the quenching speed is reduced. The object of the method is increased ductility and improvement of the workability of the metal sheet.

For this process, the metal sheet is heated to approximately 1000° C. However, because of the use of high frequency, the process is restricted in application to thin metal sheets. By changing the feed rate of the inductor (which can be changed only to the same extent as the laser welding rate defined by other criteria), the temperature, the inductor length and width, the cooling speed may be varied within a relatively narrow framework.

A drawback of this method is that it can be used only for thin metal sheets and only very limited for hardenable steel. It is therefore not usable for power transmission elements or mechanically functional components.

The nature of the above drawback is that the superimposed temperature time cycle of the inductive post-heating cannot be adjusted, or at least cannot be adjusted for all depth zones, within the welding seam to the requirements necessary to avoid hardening with beam welding of hardenable steels. Specifically, since the heating depth is not adjustable to the necessary welding seam depth, the cooling speed cannot be selected adequately small (or at least not for the entire welding seam depth). The high peak temperature of the post-heating cycle therefore destroys the defined normalized or tempered structure. Because the heating depth with the inductive application of energy is too little with a high frequency, heat energy is not introduced until after termination of the welding process. The and the heat penetration rate into the component is comparatively small relative to the laser welding speed. The limiting isotherm of adequately higher annealing temperatures reaches the deeper regions of the welding seam only after periods of time in which the temperature has already fallen below the $M_S$-temperature. Consequently, hardening occurs. The high peak temperature of approximately 1000° C., which is higher than the austenitizing temperature and which results from the relative heating depth which is slight with reference to the component thickness as well as the relatively high quenching speed resulting from the high feed rate leads moreover to the danger of new hardening even in regions outside the HAZ of the welding zone.

SUMMARY OF THE INVENTION

The present invention provides a method by which hardenable steels may be effectively welded crack-free and without troublesome hardening.

The present invention uses a transient temperature field and a method to produce it which can be readily integrated into processes and which is adaptable even for hardenable steels with relatively high critical cooling times and relatively deep welding seams. The entire welding seam has has an adequately low cooling speed and the normalized or tempered basic structure of the initial state outside the welding zone and the heat affected zone is not damaged.

The short-time heat treatment is performed as the sole preheating. The heating depth before the beginning of the beam welding $t_{i2}$ is selected such that it reaches 1.0 to 5.0 times the welding seam depth. The energy exposure time itself, the induction frequency, and, to a small extent, the peak temperature $T_{max}$ of the preheating cycle serve as free parameters for the setting of the heating depth $t_{i2}$.

The peak temperature is selected in a temperature range from 620 K≦$T_{max}$≦$T_Z$–30 K., whereby the temperature $T_Z$ depends on the starting structure of the materials to be joined. In the pearlitic state, $T_Z$ corresponds to the temperature at which a perceptible spheroidizing of cementite begins within a period of 1 second to 100 seconds. In the tempered initial state, it corresponds to the temperature of the preceding annealing treatment. The selection of this temperature guarantees the best conditions for the subsequent cooling cycle without damaging the structure.

It is crucial for the welding result, and particularly advantageous for the process design, that the quenching time $\tau_k$ is adjusted by the use of the natural cooling capacity of the component. The relative depth and the width of the preheating zone serve as free parameters for adjustment of the concrete value $\tau_k$.

The heating depth $t_{i1}$ may be adjusted after the end of the energy exposure cycle by the frequency of the induction generator. Thus, the energy exposure period $\tau_S$ and the cooling time $\tau_A$ are reduced. Moreover, additional degrees of freedom are obtained for the adaptation of the duration of the energy exposure $\tau_S$ to the welding time $\tau_L$, which is essential for cycle time optimization.

Through the selection of the energy exposure period $\tau_S$, the maximum temperatures $T_{max}$, the cooling times $\tau_a$, and the geometric dimensions of the preheating zone $b_{i1}$ and $t_{i1}$, it is possible to complete the preheating cycle fully before the welding cycle. This permits more free space in the layout of corresponding welding machine designs.

The maxima of the temperature field for preheating may be placed at distances of one to three times the wall thickness of the component. Thus, in the case of critical materials with particularly high $t_{8/5}$-times, a particularly low cooling speed is achieved at the joint with constant maximum temperatures of the preheating cycle.

Leakage of the air from inside closed hollow parts through the joining gap can be prevented, although the pressure of the air is increased by the preheating. Thus, very good welding seam quality is achieved without additional vent holes, which are often undesirable and require additional production expense, and hose pores reaching all the way to the surface of the welding seam are avoided.

Necessary hardening or tempering treatments possibly following the welding operation may be integrated into the heat treatment cycle of the welding by using simple process technology and optimum utilization of energy.

For production technology reasons, the individual parts to be joined are easier to harden than finished welded structures.

BRIEF DESCRIPTION OF THE DRAWING

The invention is explained in detail with reference to the following exemplary embodiment.

The associated drawing (FIG. 1) is a schematic depiction of a welded component.

DETAILED DESCRIPTION OF THE EXEMPLARY EMBODIMENT

Figure 1:
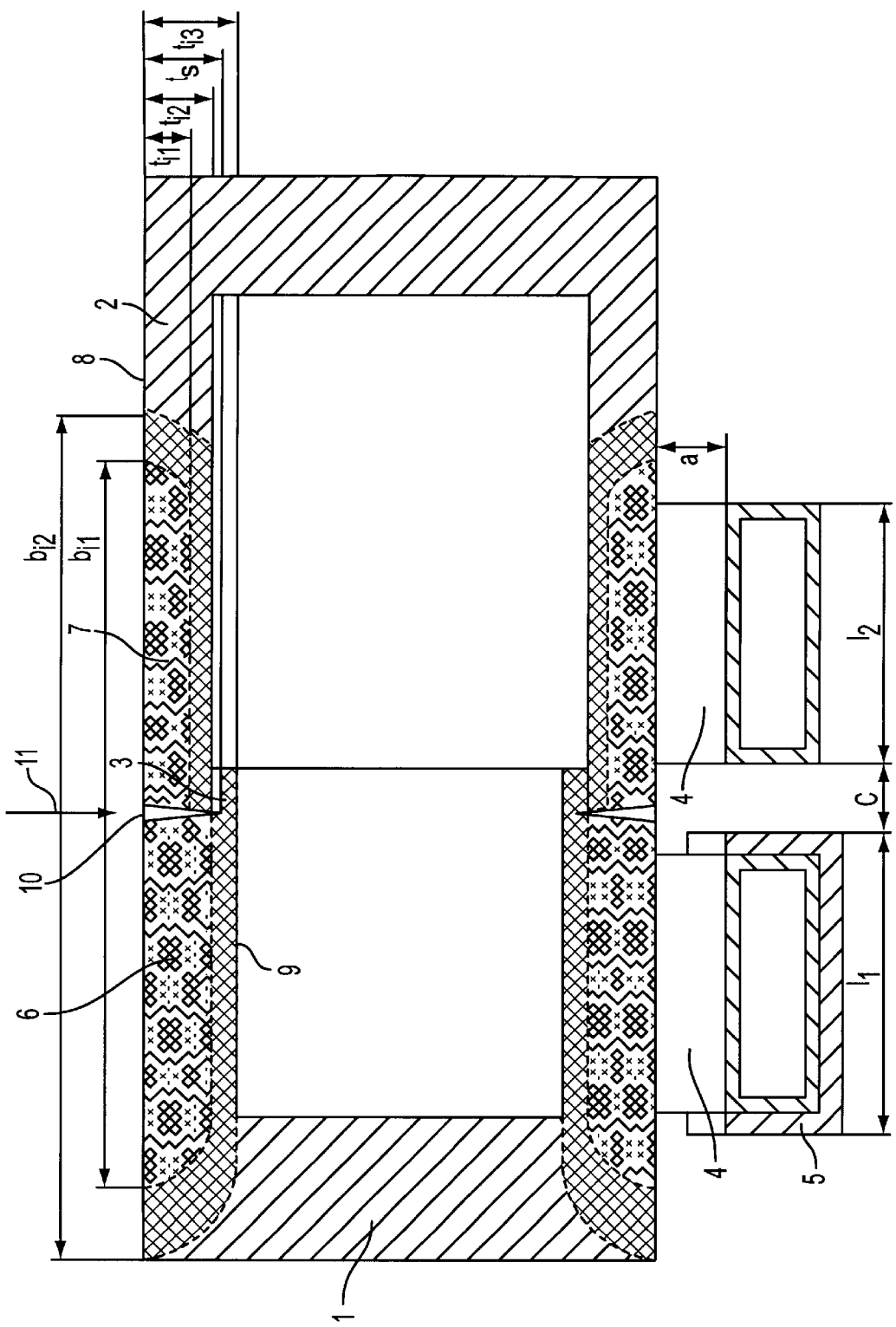

Two parts 1 and 2 are to be welded in to FIG. 1 with an axial circumferential seam. The external diameter of both parts is 45 mm. The inner diameter of part 2 is 35 mm. Part 1 is provided with seam support 3, which is 3 mm thick. The parts are joined with an overdimension from 0.05 to 0.13 mm. Both parts are made of C45 and are in the normalized state. Their hardness is 225 $HV_{0.05}$.

An inductive introduction energy is selected as the preheating method. The induction frequency is 10 kHz. The inductor 4 is a double-winding half-shell inductor. Implementation as a half-shell inductor simplifies automated feeding and removal of the joined parts 1 and 2 into and out of the heating station. The inductor 4 has field amplification sheets 5 on the winding opposite part 1, which, despite the greater wall thickness of the part 1, provides an average temperature $T_1$ inside the inductive heating zone 6, which is higher than the average temperature $T_2$ in the inductive heating zone 7. The coupling distance a is a=5 mm. The inductor has a total width $I_g=I_1+c+I_2=30$ mm. The selection of the total width $I_g=30$ mm permits adequately long cooling times. An inductor with $I_g=16$ mm (also tested) had shorter cooling times, which, with identical maximum temperatures $T_{max}$ results in a higher but still tolerable hardness. The distance c between the two inductor windings is 4 mm. Through the selection of this relatively large winding space compared to the joint, edge overheating is prevented. Simultaneously, the two temperature maxima produced by the inductive preheating develop at a distance of roughly 7 mm each from the joint. During the cooling time $\tau_A$ between the end of the inductive energy exposure period and the beginning of the welding, additional heat also flows to the joint such that the temperature drops particularly slowly until the beginning of the welding, such the necessary maximum temperature $T_{max}$ may be selected lower.

Laser welding is selected as the welding method. A 5.0 kW-$CO_2$-laser is used for the welding; the laser welding rate is 1.7 m/min. The focus of the laser beam 11 is positioned 1.0 mm below the surface of the component.

After clamping the mechanically joined parts 1 and 2, they are moved at a rotational speed of 300 rpm. The induction generator is set to a power of 62 kW. After the end of the energy exposure period of $\tau_S=7.0$ s, the part 1 has a maximum temperature $T_{max1}$ of $T_{max1}=655°$ C. and the part 2 a maximum temperature $T_{max2}=610°$ C. The heating depth $t_{i1}$ is approximately $t_{i1}$~4.5 mm, and the heating width $b_{i1}$ is approximately $b_{i1}$~34 mm. After a cooling time of $\tau_a=8.0$ s, the laser welding is begun. The surface temperatures at this time are approximately $T_{O1}=590°$ C. and $T_{O2}=570°$ C., respectively. The average temperature in part 1 is still slightly higher than in part 2. The heating zone (defined by the heating depth and heating width) has expanded to the dimensions $t_{i2}=5.0$ mm, $t_{i3}=8.0$ mm, $b_{i2}=42$ mm. The temperature differential between the external diameter 8 and the inside diameter 9 is very small and amounts to a maximum of 20° K.

The welding is performed with a laser power of 4.0 kW. Including the welding of the overlapping region, the laser welding $\tau_L=5.4$ s. The welding depth of the laser welding seam 10 reaches approximately 60 mm. The time $t_{8/5} \geq t_k$ in the welding zone and in the heat affected zone is approximately 19 s. This is significantly greater than the critical cooling time for the formation of martensite, which is approximately 2 s for C45.

The laser welding seam 10 has an average hardness of 280 $HV_{0.05}$, is completely crack-free and consists almost completely of ferrite and pearlite. In contrast, if welding is performed without preheating, the average hardness in the welding zone is 665 $HV_{0.05}$. Both the welding zone and the inner edges of the heat affected zone are completely martensitic and exhibit 9 cracks on an average.

What is claimed is:

1. A method for welding hardenable steel, said method comprising:

preheating said steel for an energy exposure period $\tau_S$ greater than or equal to 0.3 s and less than or equal to 20 s, such that a heating depth is between 0.3 and 5.0 times a welding seam depth $\tau_S$, and a peak temperature $T_{max}$ greater than or equal to 620° K. and less than or equal to $T_Z$–30° K., where $T_Z$ corresponds to a temperature of a preceding annealing treatment when said steel is in a hardened and annealed initial state, and corresponds to a temperature at which spheroidizing for cementite perceptibly being in said steel between 1 s and 100 s when said steel is in a ferritic-pearlitic initial state;

permitting said steel to cool for a time $\tau_A$ greater than or equal to 0.01 s and less than or equal to 30 s, such that said heating depth is between 1.0 weld seam depth $t_S$ and 5 weld seam depth $t_S$, welding said steel;

quenching a welding zone and a heat affected zone of said steel for a time $t_{8/5}$, which is greater than or equal to $\tau_K$, where $\tau_K$ corresponds to a quenching time in which a proportion of ferrite, pearlite, and bainite in said welding and heat affected zone is at least 70% and a hardness of said welding and heating zones are less than 350 $VH_{0.05}$; and increasing a width of and a relative depth of a preheating zone of said steel until cooling takes place so slowly that $\tau_K$ is reached or exceeded.

2. The method of claim 1, wherein said welding comprises laser beam welding, and said preheating comprises inductive heating.

3. The method of claim 1, wherein said welding comprises electron beam welding, and said preheating comprises one of inductive heating and electron beam heating.

4. The method of claim 1, wherein said welding comprises laser beam welding, and said preheating comprises using at least one diode laser stacks.

5. The method of claim 1, wherein said heating depth after said energy exposure period is defined by a frequency of an inductive generator.

6. The method of claim 1, wherein said preheating concludes before said welding.

7. The method of claim 1, wherein said energy exposure period is approximately the same as a time over which said welding occurs.

8. The method of claim 1, wherein a temperature field during said preheating is such that a temperature maxima during said preheating occurs at a distance of between approximately 1 to 3 times a wall thickness of a component of said steel.

9. The method of claim 1, wherein said steel comprises first and second hollow parts, said welding comprises forming a joint with a seam support such that said hollow parts form a press fit, said press fit being maintained during said preheating and said welding, and an average temperature of said first hollow part is maintained higher during said preheating and said welding than said second hollow part.

10. The method of claim 1, further comprising hardening and annealing said steel after said welding.

11. The method of claim 1, wherein said steel includes at least two components, and said method further comprises one of thoroughly hardening, surface hardening, and case hardening at least one of said at least two components before said preheating, and annealing said steel after said welding using residual heat from said preheating.

12. The method of claim 1, wherein an annealing temperature is defined by one of local liquid and gas cooling.

13. A method for welding first and second components of steel, said method comprising:

clamping said first and second components;

rotating said first and second components as clamped;

preheating, for an energy exposed period $\tau_S$, said first component to a first temperature and said second component to a second temperature, said first temperature being higher than said second temperature;

permitting said steel to cool for a time $\tau_A$, which is greater than or equal to 0.01 s and less than or equal to 30 s;

welding said steel; and quenching said steel, wherein said energy exposure period $\tau_S$ is greater than or equal to 0.3 s and less than or equal to 20 s, such that a heating depth is between 0.03 and 5.0 times a welding seam depth $t_S$, and a peak temperature $T_{max}$ is greater than or equal to 620° and less than or equal to $T_Z$–30° K., where $T_Z$ corresponds to a temperature of a preceding annealing treatment when said steel is in a hardened and annealed initial state, and corresponds to a temperature at which spheroidizing of cementite perceptibly being in said steel between 1 s and 100 s when said steel is in a ferritic-pearlitic initial state.

14. A method for welding first and second components of steel, said method comprising:

clamping said first and second components;

rotating said first and second components as clamped;

preheating, for an energy exposed period $\tau_S$, which is greater than or equal to 0.3 s and less than or equal to 20 s, said first component to a first temperature and said second component to a second temperature, said first temperature being higher than said second temperature;

permitting said steel to cool for a time $\tau_A$;

welding said steel; and quenching said steel, wherein said time $\tau_A$ is greater than or equal to 0.01 s and less than or equal to 30 s, such that a heating depth is between approximately 1.0 weld seam depth $t_S$ and 5 weld seam depth $t_S$.

\* \* \* \* \*